(12) United States Patent
Dixon

(10) Patent No.: US 10,823,952 B2
(45) Date of Patent: Nov. 3, 2020

(54) MSIA SCANNING INSTRUMENT WITH INCREASED DYNAMIC RANGE

(71) Applicant: Arthur Edward Dixon, Waterloo (CA)

(72) Inventor: Arthur Edward Dixon, Waterloo (CA)

(73) Assignee: HURON TECHNOLOGIES INTERNATIONAL INC., Waterloo (CA)

( * ) Notice: Subject to any disclaimer, the term of this patent is extended or adjusted under 35 U.S.C. 154(b) by 0 days.

(21) Appl. No.: 16/015,853

(22) Filed: Jun. 22, 2018

(65) Prior Publication Data

US 2018/0373017 A1 Dec. 27, 2018

Related U.S. Application Data

(60) Provisional application No. 62/523,545, filed on Jun. 22, 2017.

(51) Int. Cl.
| | |
|---|---|
| *G02B 21/36* | (2006.01) |
| *G02B 21/12* | (2006.01) |
| *G02B 21/16* | (2006.01) |
| *G02B 21/00* | (2006.01) |
| *G01N 21/64* | (2006.01) |

(52) U.S. Cl.
CPC ....... *G02B 21/367* (2013.01); *G01N 21/6458* (2013.01); *G02B 21/0024* (2013.01); *G02B 21/125* (2013.01); *G02B 21/16* (2013.01); *G02B 21/361* (2013.01)

(58) Field of Classification Search
CPC .............. G02B 21/367; G02B 21/0024; G02B 21/125; G02B 21/16; G02B 21/361; G01N 21/6458

USPC ....................................................... 250/458.1
See application file for complete search history.

(56) References Cited

U.S. PATENT DOCUMENTS

| | | | | |
|---|---|---|---|---|
| 6,320,196 B1* | 11/2001 | Dorsel | ............... | G01N 21/6402 250/458.1 |
| 2004/0079893 A1* | 4/2004 | Dietz | ................. | G01N 15/1475 250/458.1 |
| 2008/0116392 A1* | 5/2008 | Brooker | ............. | G02B 21/0076 250/458.1 |
| 2009/0238435 A1 | 9/2009 | Shields | | |

(Continued)

FOREIGN PATENT DOCUMENTS

| | | |
|---|---|---|
| CA | 2849330 A1 | 3/2013 |
| WO | 2012083438 A1 | 6/2012 |
| WO | 2016154729 A1 | 10/2016 |

*Primary Examiner* — Taeho Jo
(74) *Attorney, Agent, or Firm* — Woods Oviatt Gilman LLP; Dennis B. Danella, Esq.

(57) ABSTRACT

An instrument for scanning a specimen on a specimen holder. The instrument includes a scanning stage for supporting the specimen and a detector having a plurality of pixels. The scanning stage and the detector are movable relative to each other to move the specimen in a scan direction during a scan, and at least some of the pixels of the detector are operable to collect light inside the specimen during the scan and generate corresponding image data. The instrument also includes a processor operable to perform MSIA on the image data and to generate two or more strip images. Each strip image has a different effective exposure. The processor combines the two or more strip images to generate an increased dynamic range (IDR) image of the specimen.

19 Claims, 14 Drawing Sheets

(56) References Cited

U.S. PATENT DOCUMENTS

| | | | |
|---|---|---|---|
| 2010/0094135 A1* | 4/2010 | Fang-Yen | G01B 9/02057 600/476 |
| 2011/0134280 A1* | 6/2011 | Chou | H04N 5/2354 348/234 |
| 2012/0153188 A1* | 6/2012 | Barrett | G01N 33/84 250/461.1 |
| 2013/0015370 A1* | 1/2013 | Damaskinos | G01N 21/6452 250/459.1 |
| 2013/0155499 A1* | 6/2013 | Dixon | G02B 21/06 359/385 |
| 2013/0321814 A1* | 12/2013 | Zhan | G01N 21/59 356/432 |
| 2013/0342674 A1* | 12/2013 | Dixon | G02B 21/36 348/79 |
| 2014/0125776 A1* | 5/2014 | Damaskinos | G02B 21/367 348/50 |
| 2014/0231638 A1* | 8/2014 | Damaskinos | G02B 21/002 250/234 |
| 2015/0054921 A1* | 2/2015 | Dixon | G02B 21/006 348/46 |
| 2015/0109432 A1* | 4/2015 | Dixon | G02B 21/008 348/79 |
| 2016/0004062 A1* | 1/2016 | Dixon | G06T 7/20 348/80 |
| 2016/0299326 A1* | 10/2016 | Eggert | G02B 21/367 |

* cited by examiner

Fig. 1 MSIA scanner

| R | R | R | R | R |
|---|---|---|---|---|
| G | G | G | G | G |
| B | B | B | B | B |
| W | W | W | W | W |
| R | R | R | R | R |
| G | G | G | G | G |
| B | B | B | B | B |
| W | W | W | W | W |

Fig. 3 Centre section of an RGBW scan filter

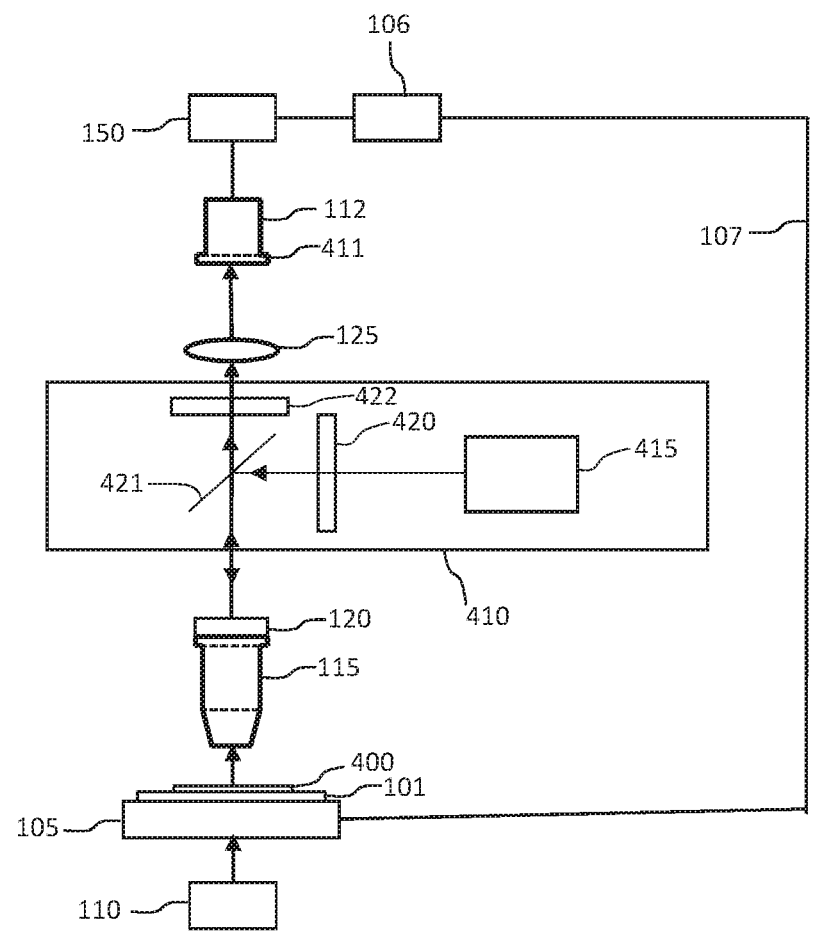
Fig. 4 Brightfield and Fluorescence MSIA scanner

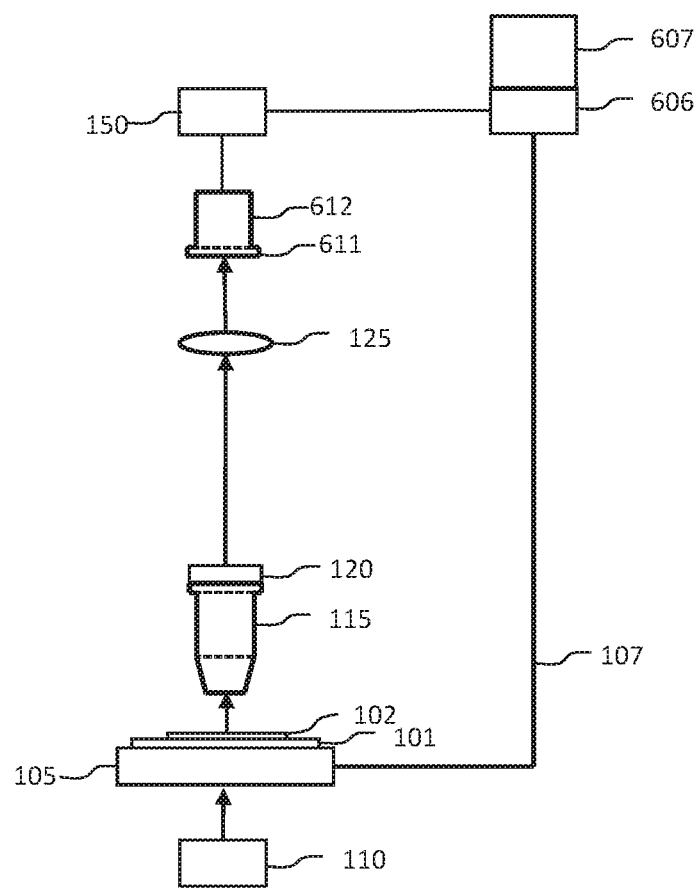
Fig. 6 Multiple Exposure Brightfield MSIA scanner

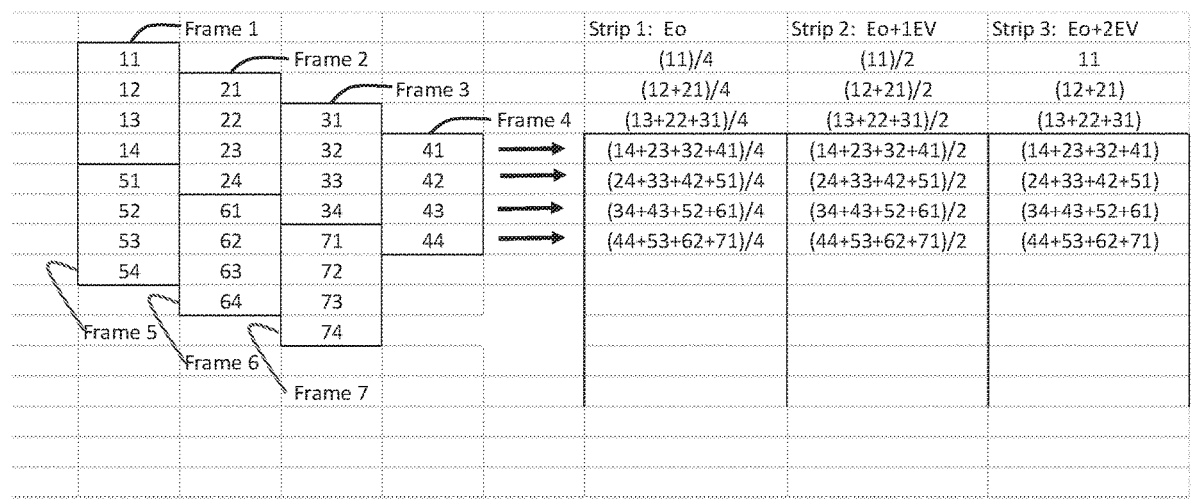
Figure 7 – Data manipulation and image store

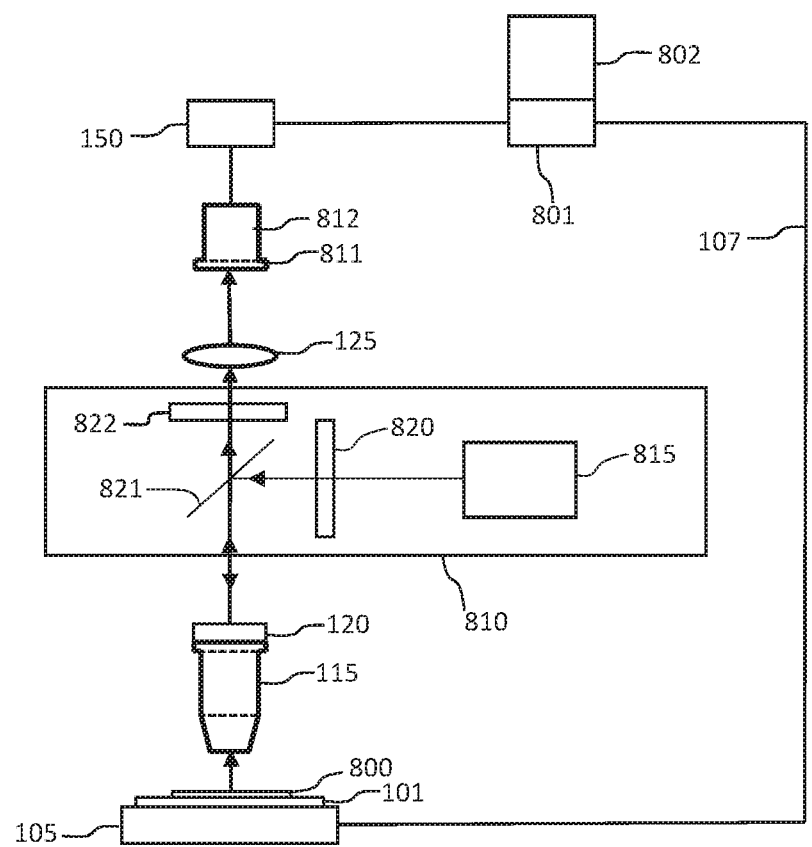
Fig. 8 Multiple Exposure Fluorescence MSIA scanner

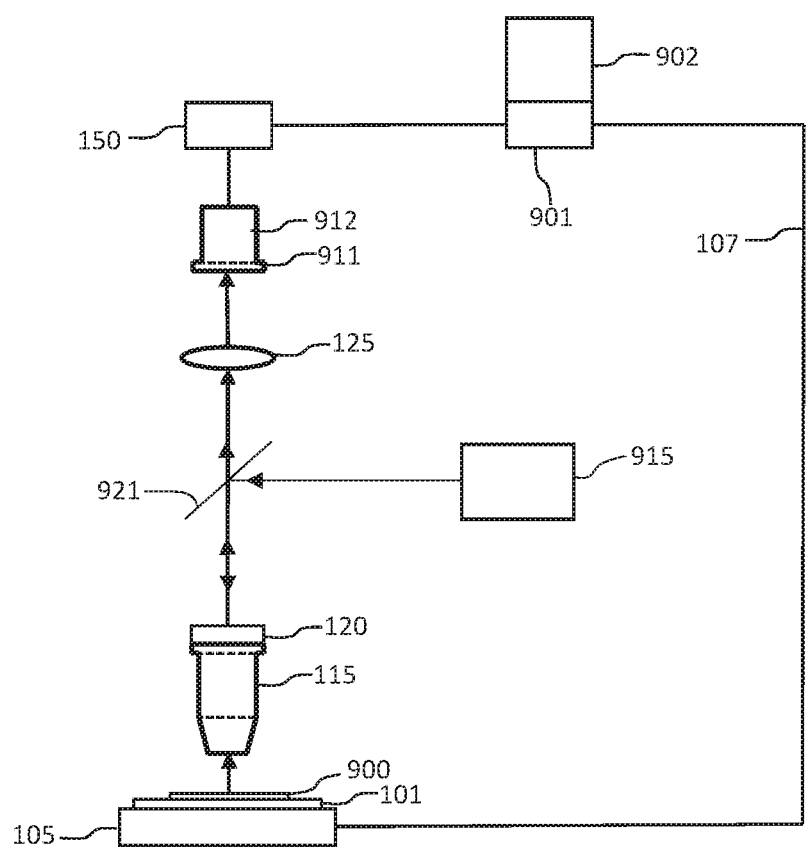
Fig. 9 Multiple Exposure MSIA scanner for simultaneously imaging multiple fluorophores

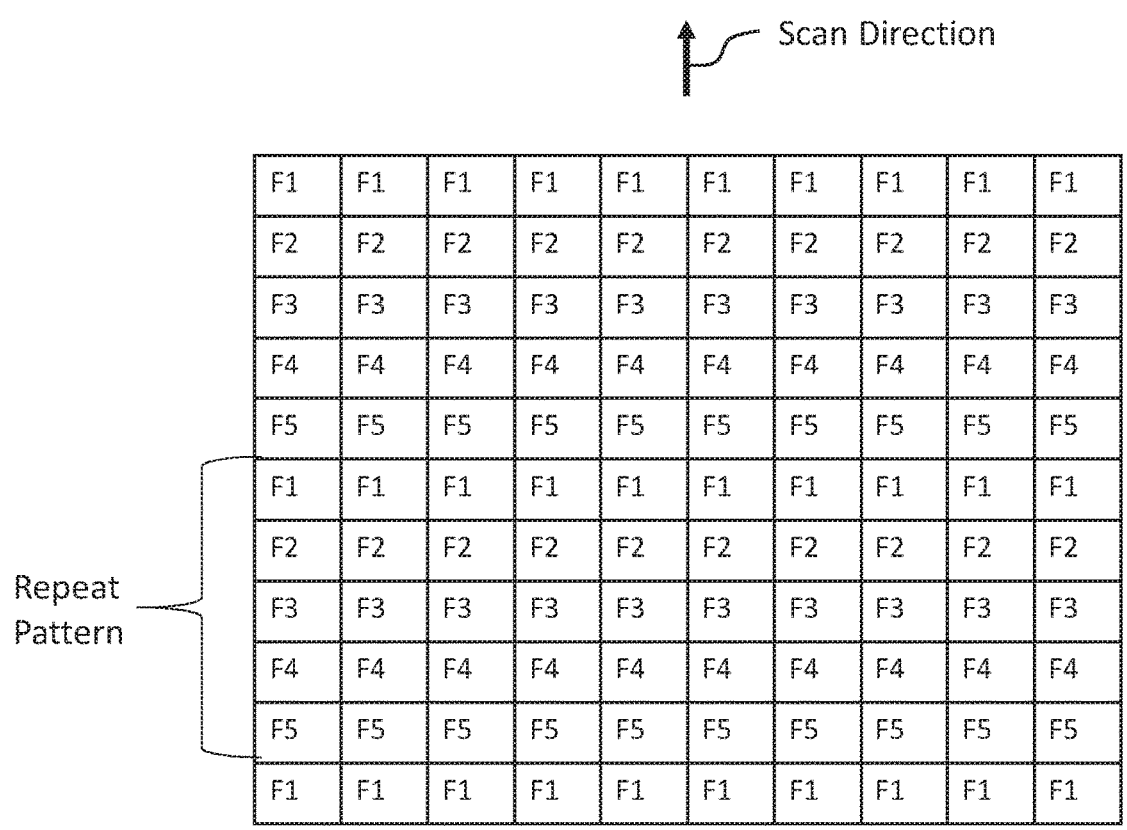
Figure 10 Scan filter for multispectral imaging (Five fluorophores)

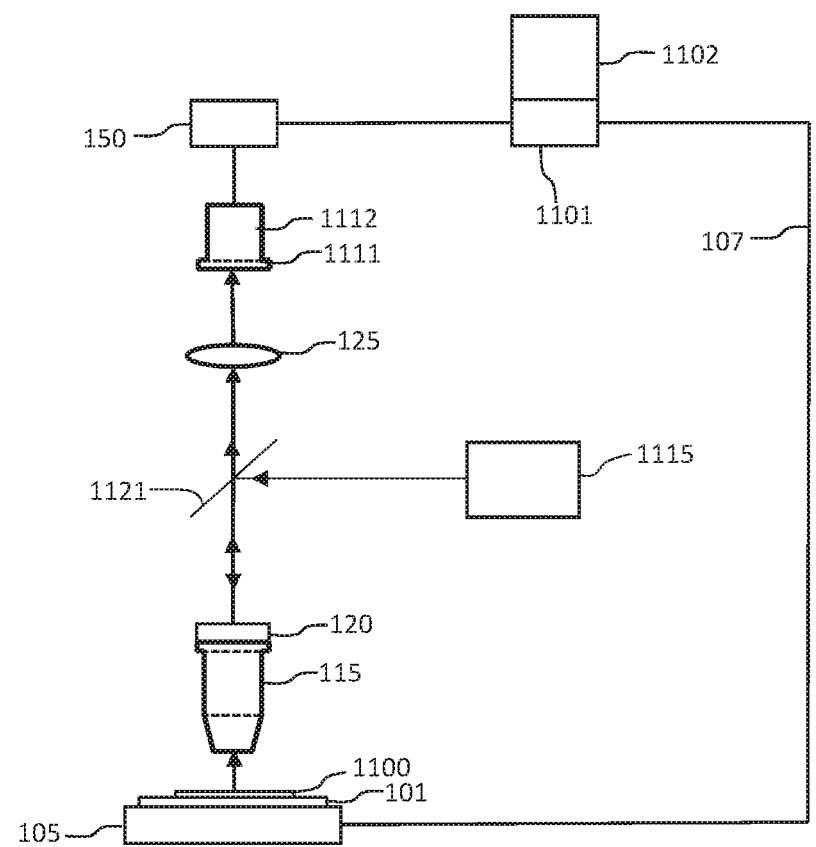
Fig. 11 Multiple Exposure MSIA scanner for hyperspectral imaging

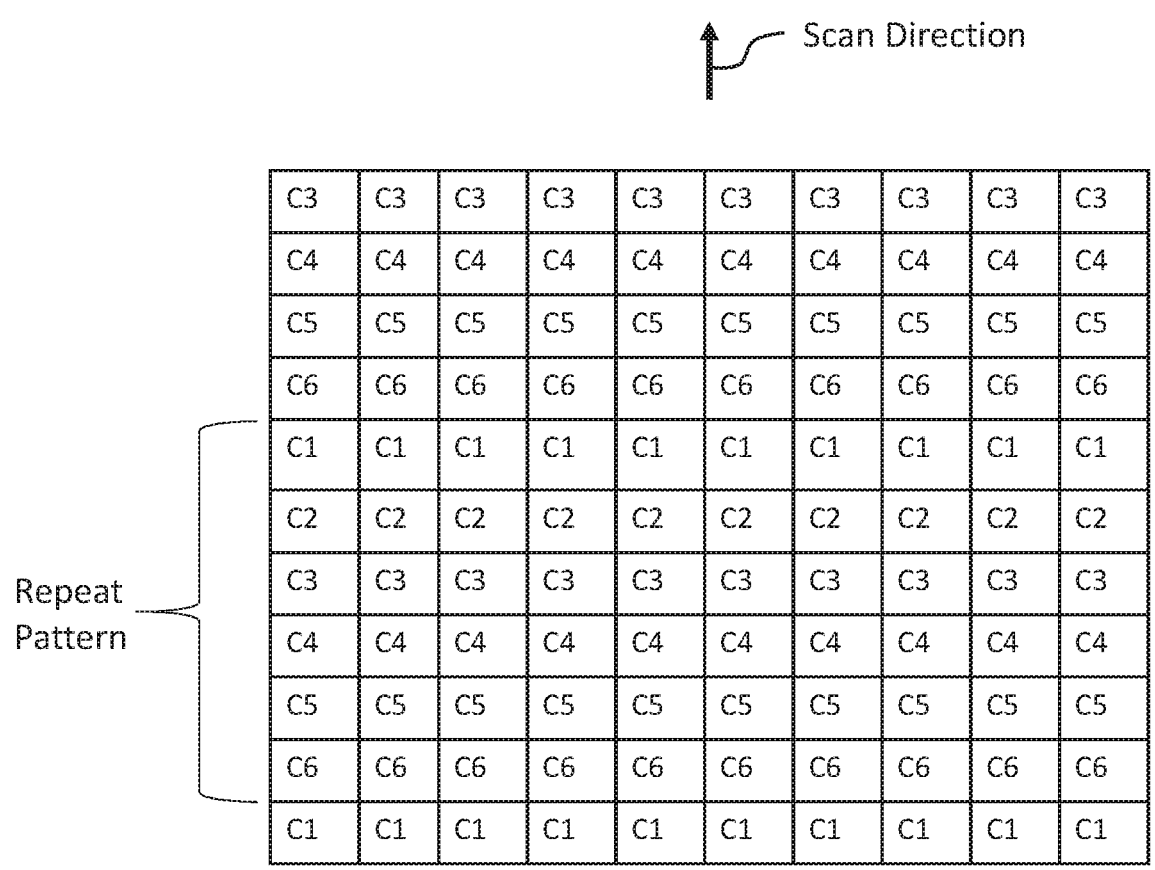
Fig. 12  Scan filter for Hyperspectral Imaging

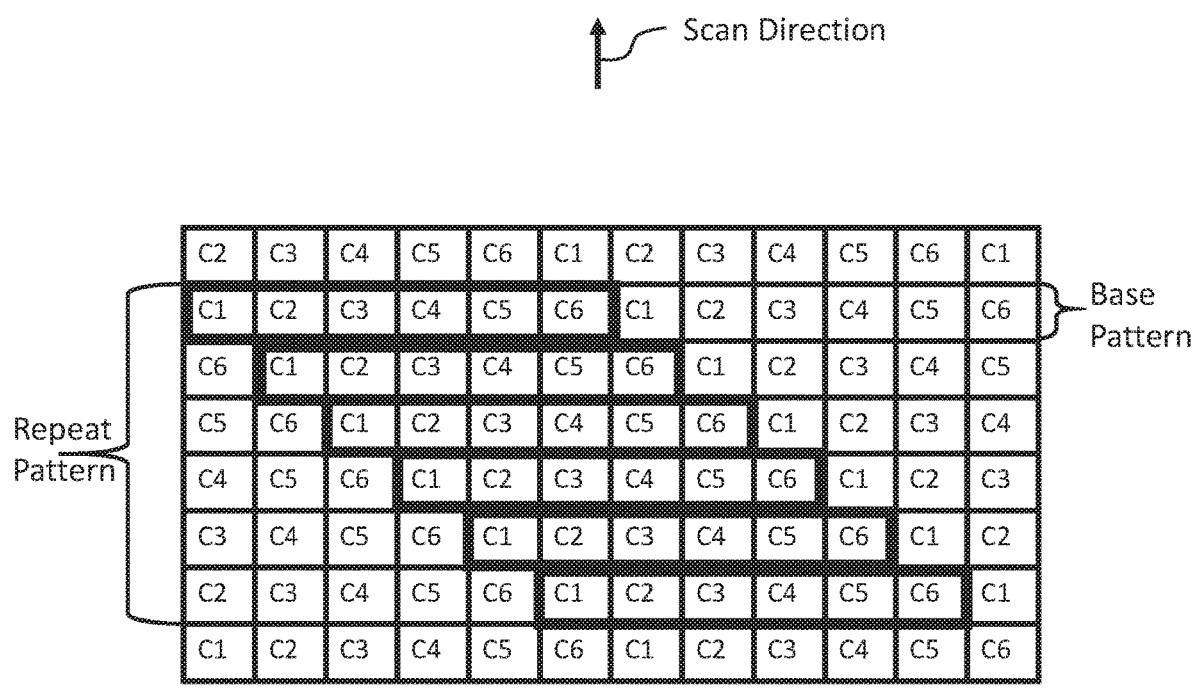
Fig. 13 Mosaic Scan Filter Array for hyperspectral imaging comprised of one-row by six-column tiles

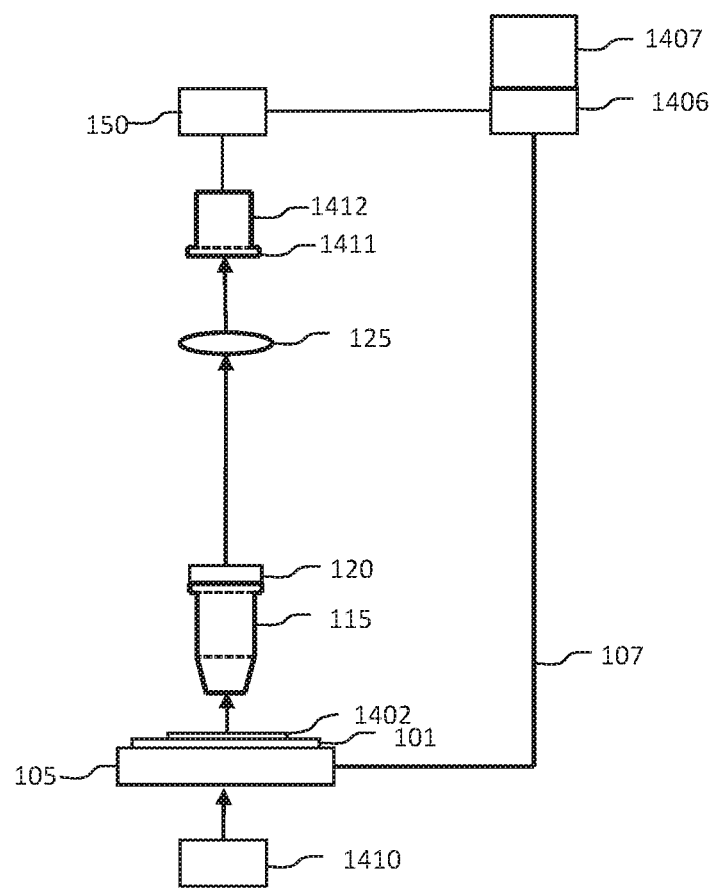
Fig. 14 Multiple Exposure Brightfield MSIA scanner

MSIA SCANNING INSTRUMENT WITH INCREASED DYNAMIC RANGE

TECHNICAL FIELD

Embodiments herein relate to the fields of scanning microscope imaging of large specimens with particular emphasis on RGB brightfield imaging, as well as fluorescence and spectrally-resolved imaging. Applications may include imaging tissue specimens, genetic microarrays, protein arrays, tissue arrays, cells and cell populations, biochips, arrays of biomolecules, fluorescent nanoparticles, semiconductor materials and devices, and many others.

Definitions

For the purposes of this document, a "macroscopic specimen" (or "large microscope specimen") is generally defined as one that is larger than the field of view of a microscope, such as a compound optical microscope containing a microscope objective that has the same Numerical Aperture (NA) as that of the scanner described in this document.

For the purposes of this document, "TDI" or "Time Delay and Integration" is generally defined as a method and detectors used for scanning moving objects, usually including a CCD-based detector array in which typically charge is transferred from one row of pixels in the detector array to the next in synchronism with the motion of the real image of the moving object. As the object (and its image) moves, charge builds up and the result is charge integration just as if a longer exposure were used in a stationary imaging situation. When the image (and integrated charge) reaches the last row of the array, that line of pixels is read out. One example of such a camera is the DALSA Piranha TDI camera. CMOS TDI imagers have also been developed. CCD TDI imagers typically combine signal charges, while CMOS TDI imagers typically combine voltage signals.

For the purposes of this document the term "image acquisition" generally includes the steps necessary to acquire and produce a final image of the specimen, which may include some of but is not necessarily limited to the following: the steps of preview scanning, instrument focus, predicting and setting gain for imaging each fluorophore, image adjustments including demosaicing (where required), scan linearity adjustment, field flattening (compensating for fluorescence intensity variation caused by excitation intensity and detection sensitivity changes across the field of view), correction of fluorescence signal in one channel caused by overlap of fluorescence from adjacent (in wavelength) channels when two or more fluorophores are excited simultaneously, dynamic range adjustment, butting or stitching together adjacent image strips (when necessary), storing, transmitting, assembling and viewing the final image.

For the purposes of this document, a "frame grabber" generally includes any electronic device that captures individual, digital still frames from an analog video signal or a digital video stream or digital camera. It is often employed as a component of a computer vision system, in which video frames are captured in digital form and then displayed, stored or transmitted in raw or compressed digital form. This definition may include direct camera connections via USB, Ethernet, IEEE 1394 ("FireWire") and other interfaces that are now practical.

Moving Specimen Image Averaging ("MSIA") is generally defined as the method and technology for acquiring digital strip images (i.e., image strips) across a large microscope specimen by capturing sequential overlapping frame images of a moving specimen, typically where a new image frame is captured each time the specimen has moved a distance that causes the image of that specimen projected by the optics onto a two-dimensional detector array to move a distance equal to the distance between a small number of rows of detectors in the detector array (where this number is normally held constant while scanning digital image strips), image data from the new frame is translated (moved) in computer memory to match the motion of the optical image across the detector array, and is averaged with (or in some cases may be added to) the data previously stored to generate an image of a strip across the specimen. In some cases, such a procedure may be continued until the specimen has moved a distance such that all object points in that strip have been exposed a number of times equal to the number of active rows in the detector array (usually chosen by defining a "detector area of interest" that has the width of the detector but a smaller number of rows than the detector array contains) divided by the number of rows moved between each successive image capture (usually one row). All pixels in the image strip that results tend to have increased signal-to-noise ratio (S/N) because of pixel averaging, where the increased signal-to-noise ratio is equal to the square root of the number of times each pixel has been averaged to produce the final MSIA strip image, and increased dynamic range because of the reduction of noise caused by averaging (especially in the dark pixels).

As used herein, the terms "frame image" and "image frame" are identical to one another and are used interchangeably.

"Fluorescence" generally includes fluorescence from naturally-occurring sources inside the specimen and fluorescent dyes and markers (including for example quantum dots) that may be added to the specimen, as well as fluorescence from the substrate or a layer above the specimen.

"Spectral imaging" generally refers to the method and technology for acquiring images in which each pixel is represented by its spectrum.

"Hyperspectral imaging" generally refers to the method and technology for acquiring images in which each pixel is represented by a spectrum composed of narrow spectral bands over a continuous spectral range.

"Imaging spectroscopy" generally refers to the acquisition and processing of hyperspectral images.

"Multispectral imaging" generally refers to the method and technology for acquiring multiple images of an object, each image representing a range of wavelengths. For example, each image could represent the emission range (or part of the emission range) of a particular fluorophore. In this case each pixel in the final multispectral image may not contain a spectrum of the fluorescence emitted by the specimen at that position, but contains information about the signal detected from each fluorophore at that pixel position.

For the purposes of this document, a "mosaic scan filter array" is generally defined as a mosaic filter array that is designed for high resolution imaging using MSIA scanning, typically where the resulting image has full colour information at each pixel position and typically without demosaicing or interpolation. In a mosaic scan filter array, each row of tiles is typically translated with respect to the next row of tiles in the same direction and perpendicular to the scan direction by one pixel position.

A "scan colour filter array" is generally defined as a colour filter array comprised of a repeat pattern of rows of different colour filters, where each row contains a single colour, that has been designed for MSIA scanning such that when used in MSIA scanning every pixel position in the final image contains full colour information, typically with no interpolation required.

For the purposes of this document, "High Dynamic Range Scanning" ("HDR Scanning") is generally defined as a method and apparatus for acquiring and displaying scanned images that have a greater range of luminance levels than can be achieved with a single exposure using the scanner's image sensor, by combining two or more images, typically with the same dynamic range but with different exposures (and commonly including an underexposed image and an overexposed image)

For the purposes of this document, "Extended Dynamic Range Scanning" ("EDR Scanning") is generally defined as a method and apparatus using MSIA for acquiring and displaying scanned images that have a higher dynamic range than the dynamic range of the image sensor used in the scanner.

For the purposes of this document, an "Increased Dynamic Range Image" ("IDR Image") refers to an image generated by combining a plurality of images, each image having different effective exposures.

The method of rendering an HDR or EDR image for viewing on a standard monitor or printing device is called "tone mapping". This method reduces the overall contrast of an HDR or EDR image to facilitate display on devices or printouts with lower dynamic range, and can be applied to produce images with preserved local contrast (possibly useful in brightfield imaging of tissue specimens).

For the purposes of this document, exposure value ("EV") is typically defined as an exposure adjustment, where +1 EV is equivalent to increasing the exposure time of a first (reference) image by a factor of 2, or increasing the detector gain by a factor of 2, or increasing the illumination intensity by a factor of 2. An exposure value of +2 EV is equivalent to increasing the exposure time by a further factor of 2 (4 times the exposure time of the reference image), or increasing the detector gain by an additional factor of 2 (4 times that of the detector gain used for the reference image), or increasing the illumination intensity by an additional factor of 2. Similarly, −1 EV is equivalent to reducing the exposure time of the first (reference) image by a factor of ½, or of multiplying the detector gain by a factor of ½, or multiplying the illumination intensity by a factor of ½, etc.

SUMMARY OF VARIOUS EMBODIMENTS

One or more embodiments as described herein may provide a scanning instrument and method of imaging whereby multiple strip images with different effective exposure values (images with different effective exposure times) are acquired in a single scan. In some cases these multiple strip images can be contained in data files having the same number of bits of dynamic range.

One or more embodiments as described herein may provide a scanning instrument and method of imaging whereby multiple strip images with different effective exposure values (images with different effective exposure times) but the same dynamic range are typically acquired in a single scan, and these strip images are combined to provide one or more HDR images of the specimen.

One or more embodiments as described herein may provide a scanning instrument and method of imaging whereby multiple strip images with different effective exposure values (images with different effective exposure times) are acquired in a single scan so that exposure does not have to be adjusted before each scan of a specimen is commenced. In effect, this may allow for automatic exposure adjustment, for example after the specimen has been scanned (or in some cases during the scan).

One or more embodiments as described herein may provide a scanning instrument and method of imaging whereby multiple strip images with different contrast mechanisms, and with different exposure values (images with different effective exposure times) are acquired in a single scan in which the exposure for each contrast mechanism does not have to be adjusted before each scan of the specimen is commenced.

One or more embodiments as described herein may provide a scanning instrument and method of imaging whereby MSIA scanning is used to produce an increased dynamic range (IDR) image of a large specimen, which could be an HDR or EDR image.

One or more embodiments as described herein may provide a scanning instrument and method of imaging whereby MSIA scanning is used to produce an IDR brightfield colour image of a large specimen.

One or more embodiments as described herein may provide a scanning instrument and method of imaging whereby MSIA scanning is used to produce an EDR multispectral (e.g., fluorescence or photoluminescence) image of a large specimen.

One or more embodiments as described herein may provide a scanning instrument and method of imaging whereby MSIA scanning is used to produce an EDR hyperspectral (e.g. photoluminescence or spectrally-resolved fluorescence) image of a large specimen.

BRIEF DESCRIPTION OF THE DIAGRAMS

FIG. 3 is a schematic view of a small area of an RGBW scanning colour filter array with a 4 row repeat pattern.

FIG. 4 shows a schematic view of an MSIA scanner for brightfield and fluorescence imaging.

FIG. 6 shows a schematic view of a multiple exposure brightfield MSIA scanner.

FIG. 7 shows data flow in a Data Manipulation and Image Store (DMIS).

FIG. 8 is a schematic representation of a multiple exposure fluorescence MSIA scanner.

FIG. 9 is a schematic representation of a multiple exposure MSIA scanner for simultaneously imaging multiple fluorophores.

FIG. 10 is a schematic view of the centre area of a scanning colour filter array with colour filters that are emission filters for five different fluorophores.

FIG. 11 shows a schematic view of a multiple-exposure hyperspectral MSIA scanner for spectral imaging.

FIG. 12 shows a schematic view of the centre area of a mosaic scan filter array for hyperspectral imaging.

FIG. 13 is a schematic view of the centre area of a mosaic scan filter array for hyperspectral imaging comprised of one-row by six-column tiles.

FIG. 14 is a schematic view of a multiple-exposure MSIA scanner for colour brightfield imaging for EDR or HDR imaging.

DESCRIPTION OF VARIOUS EMBODIMENTS

Figure 1:
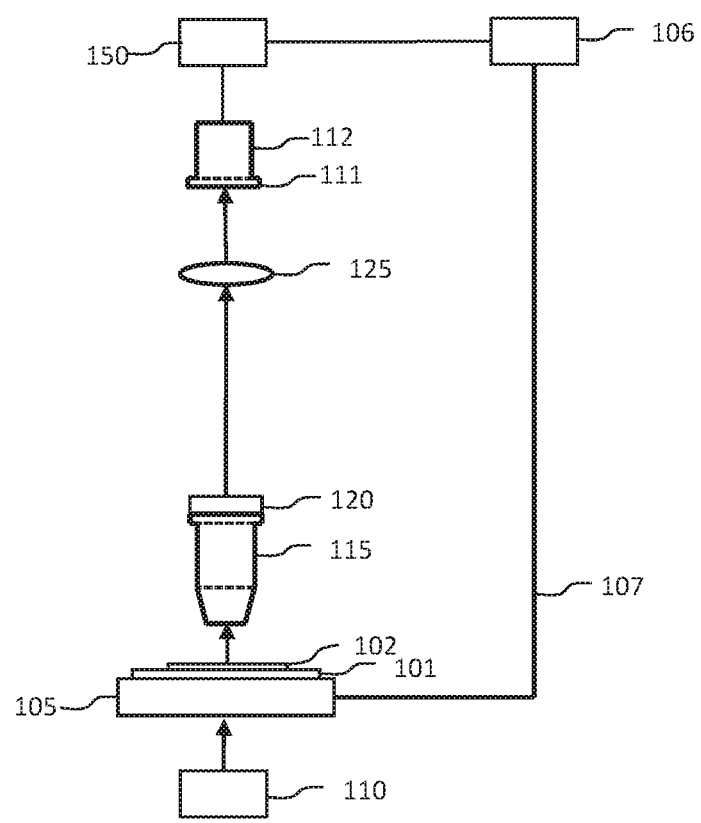
FIG. 1 shows a schematic view of an MSIA scanner.

FIG. 1 is a schematic representation of a Brightfield MSIA scanner. Light from light source 110 illuminates from beneath specimen 102, which is mounted on specimen holder 101 on computer-controlled moving stage 105. The motion of stage 105 is controlled by computer 106 through wired or wireless connection 107. Motion of the stage is in a direction perpendicular to rows in the detector array {i.e., data is read out from adjacent rows in the detector array, where the rows are usually along the long dimension of the array}. Light from the specimen is collected by microscope objective 115 which is held at a focus position above the specimen by piezo positioner 120 (or other focusing mechanism) and this light from the specimen is focused by tube lens 125 onto two-dimensional detector array 111 inside digital camera 112. When used for brightfield imaging, detector array 111 may be a monochrome array; or a scan colour filter array, a mosaic colour filter array, a Bayer filter or other colour filter array may be incorporated into the sensor array, for instance during manufacture of the 2D detector.

Pixel data from the detector array 111 inside digital camera 112 is read out by frame grabber 150 and passed to computer 106 during the scan, where an image strip is assembled for each colour represented by the filters in the Repeat Pattern of the imaging scan filter, as described below. Image data for each exposure (i.e., each frame image) is passed by the frame grabber to the computer where it may be added to or averaged with data already present in the lengthening image strips in the Moving Specimen Image Averaging (MSIA) process. Computer 106 also controls motion of scanning stage 105 and the action of the shutter (usually an electronic shutter) in digital camera 112.

Figure 2:
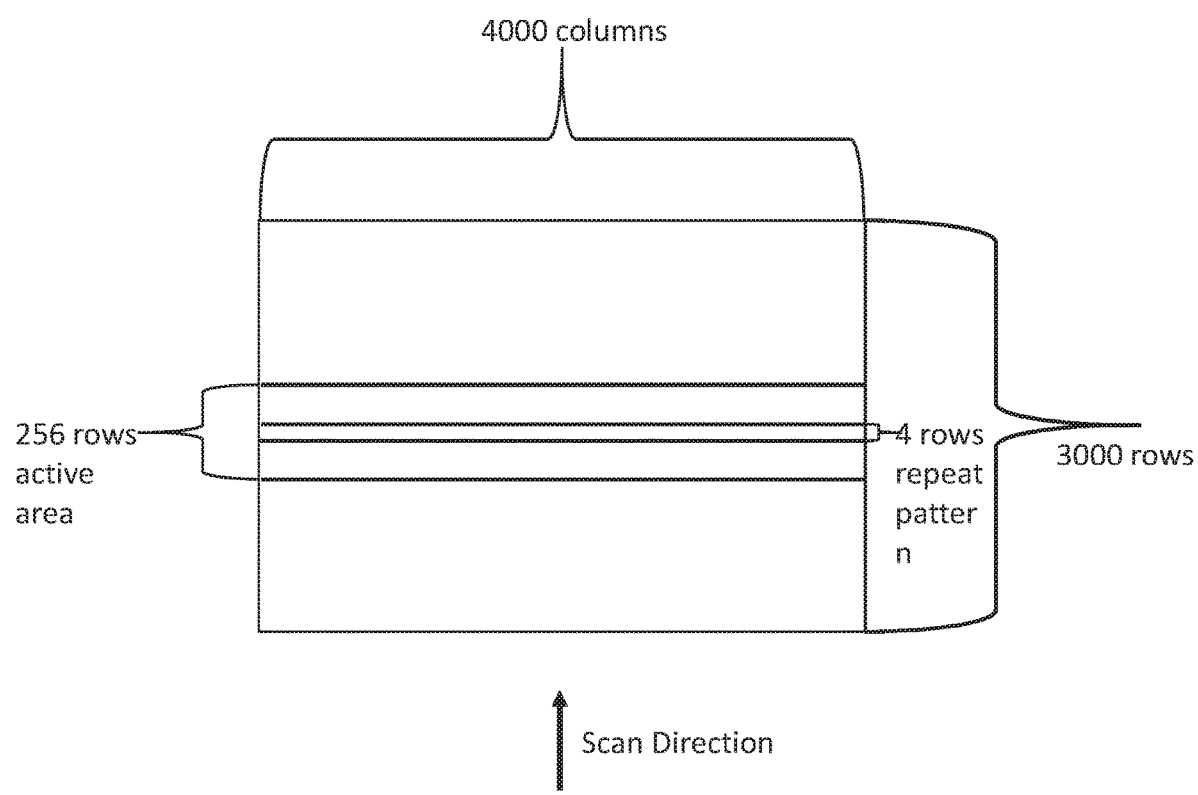
FIG. 2 is a schematic view of a 4000 column by 3000 row detector array with a 256 row active area and having a 4 row repeat pattern in its colour filter array.

FIG. 2 shows a schematic view of a detector array that is (in this example) 4000 columns of pixels wide and 3000 rows of pixels long, where commonly the entire area of the detector array is covered with a scanning colour filter array with a pattern of rows that is repeated many times, and where the repeat pattern is typically small compared to the number of rows in the array. When used for MSIA scanning, it is common to choose an active area of the detector array that includes the entire width of the array, and a smaller number of active rows near the center of the array. One example is shown in FIG. 2, where an active area of 256 rows has been chosen in this 4000×3000 pixel array, and where the entire surface of the array (or at least an area that is greater than the chosen active area) is covered by a scan colour filter array with a repeat pattern of 4 rows.

Using an active area that is smaller than the entire area of the array has the advantage of increasing the scan speed, since each frame image acquired during the MSIA scan is only 256×4000 pixels in size (in this example), and many cameras have an increased frame rate when using a small active area like this one. For this example, assume that the pattern of the scanning filter array that has been fabricated on top of the pixels in the detector array is repeated every 4 rows, like the centre section of a scan colour filter array shown in FIG. 3 {where the colour filters in the array are Red, Green, Blue, and White (clear)}.

In this particular example, when used for MSIA scanning with the active area just described, every pixel position in the repeat pattern will be exposed 64 times during the scan, so the Signal/Noise ratio in the final MSIA image strip is increased by MSIA averaging by a factor of the square root of 64 (i.e., a factor of 8). In this example, the repeat pattern is 4 rows, and the active area is 256 rows, but other active areas and colour filters with different repeat patterns can be used. Pixel data from the detector array 111 inside digital camera 112 is read out by frame grabber 150 and passed to computer 106 during the scan, where an image strip is assembled for each colour represented by the filters in the Repeat Pattern of the imaging scan filter, as described below.

Image data for each exposure is passed by the frame grabber to the computer where it is added to or averaged with data already present in the lengthening image strips in the Moving Specimen Image Averaging (MSIA) process. Computer 106 may also control motion of scanning stage 105 and the action of the shutter (usually an electronic shutter) in digital camera 112.

An active area can also be defined in software as a Software Defined Active Area (SDAA) instead of being chosen in the detector array (in hardware). In MSIA scanning, every frame image is accessible to the computer, so an active area can be defined in software after the image frame has been acquired, and image data for pixels outside the SDAA can simply be discarded. This allows the software to choose an SDAA that is smaller than that defined in the detector array (in hardware), or to define and choose an SDAA even in frame images acquired using a digital camera that does not allow active areas to be defined in the sensor.

Several combinations of rows and repeat patterns work well for MSIA scanning. Using the previous example (i.e., 4 colour filters, and an active area of 256 rows), an MSIA filter can be designed with each colour occupying single rows for a repeat pattern of 4 rows (as shown in FIG. 3), each colour occupying two adjacent rows for a repeat pattern of 8 rows, or occupying 4 adjacent rows for a repeat pattern of 16 rows, or 8 adjacent rows for a repeat pattern of 32 rows, or 16 adjacent rows for a repeat pattern of 64 rows, or 32 adjacent rows for a repeat pattern of 128 rows, or 64 adjacent rows for a repeat pattern of 256 rows. In each case every pixel in the repeat pattern will be exposed 64 times during the scan when the active area is 256 rows. In addition, it is possible to arrange these four colours in several other ways—for example as a Bayer filter, or as a mosaic scan filter array. When an RGBW Bayer filter is used for MSIA scanning, image pixels in the scanned image do not contain full colour information, and interpolation of measured values in columns adjacent to positions where colour information is lacking may be used to fill in the missing values. When a mosaic scan filter array is used, all image pixels contain full colour information after MSIA scanning, and no interpolation is required.

FIG. 4 shows a scanning microscope for fluorescence and brightfield MSIA imaging. A tissue specimen 400 (or other specimen to be imaged) is mounted on a microscope slide 101 on a computer-controlled scanning stage 105. When used for fluorescence imaging, a fluorescence optical assembly 410 for epifluorescence illumination is mounted in the microscope as shown (or other epi-illumination light source is used), and illumination is provided by light source 415 instead of transmission light source 110. This optical assembly 410 is typically comprised of a fluorescence light source 415, fluorescence excitation filter 420, dichroic beamsplitter 421, and fluorescence emission filter 422. Excitation filter 420 transmits a narrow band of wavelengths to excite a fluorophore in specimen 400, and dichroic beamsplitter 421 reflects that beam of light downwards to be focused on the specimen 400 by microscope objective 115. Fluorescence emitted from the specimen is collected by the microscope objective and passes through dichroic beamsplitter 421 and then through emission filter 422 which passes the band of emission wavelengths from the fluorophore in specimen

400. Light in this emission band is then focused on monochrome detector array 411 by microscope tube lens 125. Pixel data from the detector array 411 inside digital camera 112 is read out by frame grabber 150 and passed to computer 106 during the scan, where an image strip is assembled for the fluorophore being imaged in the specimen 400. Image data for each image frame is passed by the frame grabber to the computer where it is added to or averaged with data already present in the lengthening image strip for that fluorophore in the Moving Specimen Image Averaging (MSIA) process. Computer 106 also controls motion of scanning stage 105 and the action of the shutter (usually an electronic shutter) in digital camera 112.

When a different fluorophore is to be imaged in the specimen, typically a different combination of excitation filter 420, dichroic beamsplitter 421 and emission filter 422 is chosen to match the requirements of the new fluorophore. The combination of excitation filter, beamsplitter and emission filter that matches a particular fluorophore is often combined into a "filter cube" that can be replaced when imaging a different fluorophore.

In landscape photography, a photographer can change the exposure of a photograph by changing the shutter speed, by changing the detector gain (or film speed, when film is used), or by changing the size of the lens aperture to admit more or less light. He can also use an external flash to increase illumination of parts of the landscape.

In non-MSIA scanning microscopy, the exposure can be changed by changing the shutter speed (but the amount of change is limited by motion of the specimen relative to the detector—generally the shutter should be open only for the time it takes for the optical image of the specimen to move a distance that is less than approximately $\frac{1}{10}$ of the distance between pixels on the detector array, so that the image does not show motion blur), by changing the detector gain, or by changing the illumination intensity. Normally the microscopist cannot adjust the lens aperture. It is important to get the exposure right before making the scan, especially when doing whole-slide imaging, where the scan time can be long, and where hundreds of slides are often scanned automatically without human intervention. Repeating the scan to change exposure may interrupt the scan procedure, and will waste time.

When a fluorescent specimen contains two fluorophores, one is often much brighter than the other, typically requiring an exposure change when the second fluorophore is imaged. When TDI is used for fluorescence scanning, it is common to use a single TDI detector instead of multiple detectors (one for each fluorescence wavelength) because the large difference in fluorescence intensity of different fluorophores requires that each one must be scanned at a different scan speed, which is required to change the exposure time during TDI imaging.

One feature of an MSIA scanner is that every frame image is normally accessible to the computer as the scan proceeds. This means that successive images can be used to generate the lengthening strip image in different ways. For example, this means that pixel data in overlapping image frames can be averaged (the usual procedure in MSIA imaging) or the pixel data can be added. It also means an MSIA scanner is bidirectional (whereas a TDI-based scanner is typically not). For instance, if a detector array with a 12-bit dynamic range is used for MSIA scanning, during the scan each 12-bit image is commonly averaged with data already existing in the lengthening strip image, resulting in a final image that has the same dynamic range (12 bits), but improved signal/noise ratio.

Figure 5:
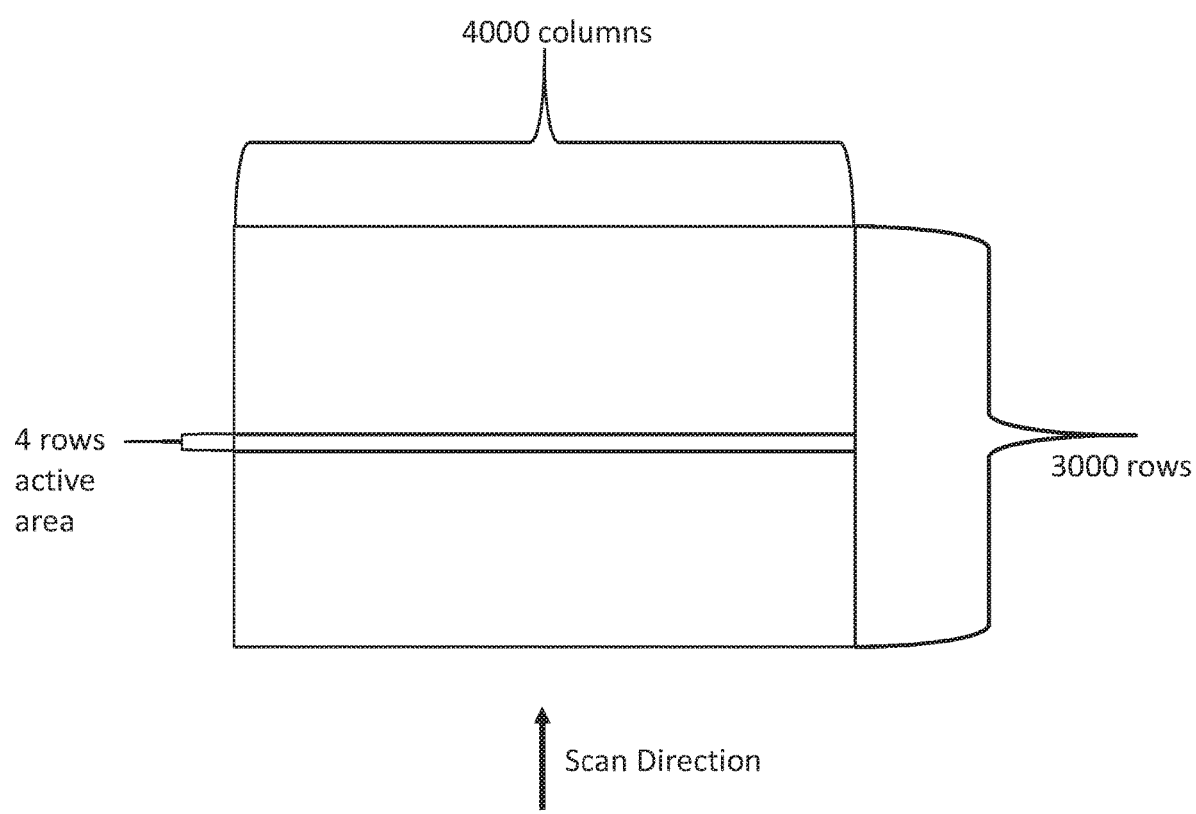
FIG. 5 shows a schematic view of a 4000×3000 pixel monochrome detector array in which the active area has been chosen to include only the centre 4 rows of pixels.

FIG. 5 shows a schematic view of a 4000×3000 pixel monochrome detector array in which the active area has been chosen to include only the centre 4 rows of pixels. This very small active area was chosen for illustration only—normally a larger active area would be used.

FIG. 6 shows a schematic view of a multiple exposure brightfield MSIA scanner according to a first embodiment. Light from light source 110 illuminates a specimen 102 from beneath, the specimen is mounted on specimen holder 101 on computer-controlled scanning stage 105. Biological specimens are normally covered by a thin transparent cover slip (not shown). The motion of scanning stage 105 is controlled by computer 606 through wired or wireless connection 107. Motion of the microscope stage is in a direction perpendicular to rows in the detector array {data is read out from adjacent rows in the detector array, where the rows are usually along the long dimension of the array, as shown in the example in FIG. 5}. Computer 606 also controls motion of scanning stage 105 and the action of the shutter (usually an electronic shutter) in digital camera 612. Light from the specimen is collected by microscope objective 115 which is held at a focus position above the specimen by piezo positioner 120 (or other focusing mechanism) and this light from the specimen is focused by tube lens 125 onto two-dimensional monochrome detector array 611 inside digital camera 612. Pixel data from the active area of detector array 611 (the image frame) inside digital camera 612 is read out by frame grabber 150 and passed to computer 606 during the scan. Computer 606 passes the image frame data to Data Manipulation and Image Store 607 after each frame has been collected.

When previous scanners are used to scan a large number of slides, one problem is to set the proper exposure for every slide before scanning. The new multiple-exposure MSIA scanner described herein helps address that problem. For instance, when the MSIA scanner described in FIG. 6 is used with a monochrome detector with a small active area of only 4 rows like that shown in FIG. 5, pixel data for each image frame (in this simple example an image frame comprises 4×4000 pixels) is passed by computer 606 to Data Manipulation and Image Store (DMIS) 607, as shown in FIG. 7.

The first image frame (frame 1) sent to the DMIS is shown at the top left of FIG. 7. The four rows of data in frame 1 (each 4000 pixels long) are labelled 11, 12, 13, and 14, where the first digit is the frame number, and the second digit is the row number inside that frame. Since there are four rows in the active area, and in this example a frame image is acquired each time the optical image of the specimen projected onto the detector array 611 moves a distance equal to the distance between rows of pixels in the detector array, each object point represented by a pixel in the scan strip image will be exposed four times as the scan proceeds. When used for Moving Specimen Image Averaging, each of the four exposures of the same object point (the same image position in the lengthening strip image) are commonly averaged together to give a S/N increase equal to the square root of the number of exposures because of data averaging (in this case S/N increase is equal to 2 since every object position is exposed 4 times). The MSIA image strip is shown as Strip 1, and the exposure is Eo for that strip. The exposure is usually set so that no (or very few) pixels in any one of the frame images are saturated, which results in what is normally considered to be the "proper" exposure for that strip image. For this example of a multiple exposure scanner, assume the camera 612 produces 12-bit images that are transferred to computer 606 by frame grabber 150. When four exposures of the first line of object positions in the strip to be imaged on the specimen are complete (as shown in the fourth line of Strip 1 in FIG. 7), the average of these four exposures {(14+23+32+41)/4} is stored as the first row of data in Strip 1, a strip image 4000 pixels wide (where in the previous formula 14, 23, 32, and 41 represent the pixel intensity of rows of pixels 14, 23, 32, and 41 in frames 1, 2, 3 and 4 respectively). Note that data in Strip 1 has the same dynamic range as the detector array does.

If the exposure for Strip 1 is too low, in an MSIA scanner it is possible to add data from subsequent exposures of the same object position instead of averaging successive exposures (averaging is the most common MSIA procedure), and this is shown in Strip 2, where the pixel intensity from the first two exposures is added together, and then averaged with the sum of the pixel intensities of exposures 3 and 4. Strip 2 is a strip image with twice the exposure (Eo+1 EV) of strip 1. Data for Strip 2 can be stored in a data file with twice the dynamic range as for Strip 1.

If the exposure for Strip 2 is still too low, the data from four exposures of the same object position can be added together as shown in FIG. 7 for Strip 3, which doubles the exposure again. Here Strip 2 has twice the exposure of Strip 1, and Strip 3 has four times the exposure of Strip 1 (Eo+2 EV) and twice the exposure of Strip 2. Note that it is not necessary to store the data for Strips 1 and 2—all of the information necessary for calculating Strip 1 and Strip 2 is available if only Strip 3 is stored. The data in Strip 3 has twice the dynamic range as that in Strip 2, and can be stored in a data file with twice the dynamic range as that used for Strip 2.

It is notable that even in this simple example, three different exposures have been acquired in the same scan. In a more realistic example, if the active area on the detector array had been defined as 16 rows, two more exposures can be acquired (Eo+3 EV and Eo+4 EV), and the dynamic range of the data file required to store Strip 5 is 4 times as large as for Strip 3. For example, if a 12 bit detector array is used, and the base exposure Eo is set so that none of the pixels in the area of interest of the specimen are saturated (in transmission imaging, the area outside the specimen may be very bright and is often saturated), then a 16 bit file can be used to store Strip 5, and image strips for five different exposures can be calculated from the data acquired in a single MSIA scan stored in a single data file in the computer.

If a "perfect exposure" is one in which the maximum dynamic range of the data acquired from the specimen (or an area of interest inside the specimen) has only one saturated pixel and all other pixels are not saturated (other definitions of "perfect exposure" are possible), then an underexposure can be achieved by adjusting the illumination intensity and the shutter speed and gain of digital camera 612 (containing array detector 611) to make it certain that there will be no saturated pixels in the area of interest inside the specimen. For this example, suppose a 12-bit detector is used, the data will be stored in a 16-bit file in the Data Manipulation and Image Store 607, 16 rows are included in the active area of the detector, and the final result desired is a perfectly exposed 12 bit image. The maximum pixel data value that can be acquired by that detector (a saturated pixel) is 4096 (12 bits), and when that pixel value is added 16 times in the MSIA process, the result is a value for that pixel of 65,536 stored in the 16-bit data file in Data Manipulation and Image Store 607. However, we have stipulated that the exposure has been set for what would normally be an underexposure, so let's assume that the maximum pixel value that is collected by the detector is 2000 (less than half the value that would be collected at saturation). After this pixel has been exposed 16 times, this data value (or values close to 2000 but slightly different in different image frames because of noise) is added 16 times to the data stored at that pixel position in the 16-bit image store, resulting in a final value for that pixel (the brightest pixel in the image) of 32000. If the imaging requirement is a perfectly exposed 12-bit image, where the brightest pixel has a value of 4096, when the stored value of every pixel in the 16-bit file is multiplied by 4096/32000, the result is a "perfectly exposed" 12-bit image, even though the exposure for each frame image was set to an estimated value that would be expected to underexpose the image before scanning, and only one scan was made along this strip across the specimen. In addition to automatically achieving a so-called "perfect exposure" in a single scan, the final image also has increased S/N because of MSIA averaging.

In some embodiments, two optional additional steps during image acquisition may improve the resulting scanned image:

First, when pixel data from a series of sequential exposures of the same object position are added to produce data for a pixel in the final scanned image (which is equivalent to a time exposure of that object position), fixed-pattern noise in the resulting strip image may be reduced by subtracting a dark-frame image from each image frame when it is acquired. A dark-frame image is commonly acquired in the dark using the same shutter speed that is used during scanning (if the shutter speed is changed, a new dark-frame image is commonly acquired). In order to better separate fixed-pattern noise from random noise, an average of several exposures (each with the same shutter speed) is commonly used as a dark frame image. This procedure (subtracting a dark-frame image from each image frame) is used to reduce the fixed-pattern noise from the detector that may exist in an image that is the sum of several exposures. However in MSIA imaging, each pixel in the resulting strip image results from averaging (or adding) pixel data from different physical pixels in the sensor array, so the effect of fixed-pattern noise is already reduced.

Second, when there is geometric distortion in the image projected by the optics onto the detector array, this may cause blurring of the MSIA scanned image, especially when the active area is large (commonly more than 16 rows). This blurring can be reduced or eliminated by correcting the image frames as they are acquired from the detector using software that corrects for geometric distortion.

Note that when both of these optional steps are performed, dark-frame image subtraction is commonly performed before geometric distortion correction. If dark-frame subtraction is performed after geometric distortion correction of the frame images, the dark-frame image should be corrected for distortion before subtraction.

FIG. 8 shows a schematic view of a multiple-exposure fluorescence MSIA scanner according to a second embodiment. Light from light source 815 passes through fluorescence excitation filter 820, is partially reflected by beamsplitter 821 and is transmitted by microscope objective 115 to illuminate specimen 800 from above (illumination from above is called epi-illumination—several other arrangements to provide epi-illumination are possible). In this example, epifluorescence illumination and fluorescence emission filtering are provided by fluorescence optical assembly 810. Specimen 800 is mounted on specimen holder 101 on computer-controlled scanning stage 105. The motion of scanning stage 105 is controlled by computer 801 through wired or wireless connection 107. Motion of the microscope stage is in a direction perpendicular to rows in the detector array {data is read out from adjacent rows in the detector array, where the rows are usually along the long dimension of the array, as shown in the example in FIG. 5}. Computer 801 also controls motion of scanning stage 105 and the action of the shutter (usually an electronic shutter) in digital camera 812. Fluorescence from the specimen is collected by microscope objective 115 which is held at a focus position above the specimen by piezo positioner 120 (or other focusing mechanism), passes through beamsplitter 821 and fluorescence emission filter 822 (chosen to match the fluorescence emission from the particular fluorophore being imaged) and this fluorescence emission from the specimen is focused by tube lens 125 onto two-dimensional detector array 811 inside digital camera 812. Pixel data from the active area of detector array 811 (the image frame) inside digital camera 812 is read out by frame grabber 150 and passed to computer 801 during the scan. Computer 801 passes the image frame data to Data Manipulation and Image Store 802 after each frame has been collected.

When a previous scanner was used to scan a fluorescent specimen containing multiple fluorophores, one issue is how much exposure change is necessary before scanning to detect the fluorescence from the next fluorophore. This is particularly problematic when scanning a series of slides, each containing different fluorophores. The new multiple-exposure MSIA scanner described herein tends to address this issue.

Consider the following example, which is one of many possibilities. When the MSIA scanner described in FIG. 8 is used with a 12-bit monochrome detector with an active area of 16 rows, pixel data for each image frame (in this example an image frame comprises 16×4000 pixels) is passed by computer 801 to Data Manipulation and Image Store (DMIS) 802. Since there are 16 rows in the active area, and in this example a frame image is acquired each time the optical image of the specimen moves a distance equal to the distance between rows of pixels, each object point represented by a pixel in the scan strip image will be exposed 16 times as the scan proceeds. The exposure for each frame image is set before starting to scan the specimen to a value that will underexpose even the brightest fluorophore. After each frame image is acquired, computer 801 passes the image frame data to DMIS 802, where the data representing each object position is added to the image pixel position for that object position in the lengthening strip image. Each object position is imaged 16 times (in this example), and this 12-bit data is added to a 16-bit strip image store. The resulting 16-bit strip image can be dynamic-range compressed to fill the dynamic range of an output image for display and analysis.

When a second fluorophore is scanned, even if it is much weaker than the first, it is likely that the new stored 16-bit image strip for that fluorophore can also be compressed to fill the dynamic range of a 12-bit image, so that no change in exposure will be necessary to scan the second fluorophore (of course activation filter 820 and emission filter 822 may have to be changed before the second fluorophore is scanned). If the difference in brightness of the fluorophores is larger than can be accommodated with a 16-row active area, an active area that is larger (e.g. 256 rows) can be used to increase the exposure of dim fluorophores even more. In this situation (256 rows) it may make sense to compress the pixel data for the strip images of the brightest fluorophores to 16 bits during scan so the strip images that are stored by DMIS 802 are a maximum of 16 bits in size, which gives ample dynamic range for further processing and is a good file size for digital storage and processing.

When the number of rows in the active area of the detector is increased (either in hardware or using software to process that number of rows near the centre of the frame image), the two optional steps described earlier become more valuable. When using an active area with 256 rows, for example, the blurring effect of geometric distortion on the scanned image is increased, making it more helpful to correct each frame image (or at least the active area) for geometric distortion. In some examples, dark-frame subtraction may also be used.

FIG. 9 shows a schematic view of a multiple-exposure multispectral MSIA scanner for simultaneously imaging multiple fluorophores according to a third embodiment. Light from fluorescence excitation light source 915 is partially reflected by beamsplitter 921 and is transmitted by microscope objective 115 to illuminate specimen 900 from above (illumination of the specimen from above is called epi-illumination—several other arrangements to provide epi-illumination are possible). Beamsplitter 921 is typically a dichroic beamsplitter chosen to reflect light from the light source and transmit fluorescence emission from the specimen. Fluorescent specimen 900 (which may contain fluorescent dyes, quantum dots or other sources of fluorescence) is mounted on specimen holder 101 on computer-controlled scanning stage 105. The motion of scanning stage 105 is controlled by computer 901 through wired or wireless connection 107. Motion of the scanning stage is in a direction perpendicular to rows in the detector array {data is read out from adjacent rows in the detector array, where the rows are usually along the long dimension of the array, as shown in the example in FIG. 5}. Computer 901 also controls the action of the shutter (usually an electronic shutter) in digital camera 912. Fluorescence from the specimen is collected by microscope objective 115 which is held at a focus position above the specimen by piezo positioner 120 (or other focusing mechanism), and this fluorescence emission from the specimen is focused by tube lens 125 onto two-dimensional detector array 911 inside digital camera 912. Two-dimensional detector array 911 includes a scanning colour filter array, one example of which is shown in FIG. 10.

A scanning colour filter array for fluorescence imaging is typically made up of a repeat pattern of rows (that extend across substantially the width of the array) of different colour filters, where each colour filter transmits the emission range (or part of the emission range) of a particular fluorophore, and where all of the filters in a row have the same colour. Scanning colour filter arrays have been designed for MSIA scanning such that when used in MSIA scanning, every pixel position in the final image contains full colour information, typically with no interpolation required.

FIG. 10 is a schematic view of the centre area of a scanning colour filter array with five colour filters that are emission filters for five different fluorophores (although five different colour filters are used in this example, scan filters with a different number of filters are common and may be used). In this example, each row of filters is different from those in adjacent rows, and the five rows form a repeat pattern that is typically repeated across the entire surface (or substantially the entire surface) of the sensor array (at least across the entire active area of the array). (Note that in some examples of scanning colour filter arrays, the same colour filters may appear in sets of two, three or more rows.) For the present example, assume that the repeat pattern is repeated 16 times inside the active area, so that the active area contains 80 rows, and that detector array 911 is a 12-bit detector array. In this particular example, every object position is exposed 16 times for each of the five colours, and during each MSIA scan, DMIS 902 stores five strip images, each of 16 bit dynamic range, one for each of the five fluorophores. As in the previous example, this results in five image strips with an exposure range of a factor of five, but in this embodiment an image strip for each of the five colours has been acquired in a single scan, and each image strip can be compressed to a smaller dynamic range, resulting in five different fluorescence image strips, each with an exposure value that is appropriate for the strength of the fluorescence displayed in that image strip.

In order to estimate how valuable this technique is for fluorescence (multispectral) imaging, assume that the illumination intensity, shutter speed and detector gain are set so that in the 16-bit image strip (or inside a specimen area of interest in this image strip) for the brightest fluorophore (which we will call F1), the maximum pixel intensity is 65,000 (this is the brightest pixel in the image strip for F1, and is the sum of 16 12-bit pixels that are nearly saturated). In the dynamic-range compressed 12-bit image strip for F1, that same pixel can be compressed to a value of 4096 (the brightest pixel in a 12-bit image) by multiplying by 4096/65000, to become the brightest pixel available in a 12-bit image. All other pixel values in that 16-bit image strip are then also multiplied by 4096/65000 to calculate their values in a 12-bit image strip where the maximum pixel value is 4096. Now assume that the brightest pixel in the 16-bit image strip for the weakest fluorophore (which we will call F2) is 5000. If the exposure of F2 had been set perfectly in a 12-bit scan, that brightest pixel should have the value 4096. Thus in DMIS 902 all of the pixel values for F2 in the 12-bit image strip should be multiplied by 4096/5000, resulting in a 12-bit strip image for F2 that has full dynamic range, just as if it had been acquired in a single scan in which the illumination intensity, shutter speed and detector gain had been set perfectly to match the brightness of F2. When the 16-bit image strips are compressed to 12 bits for analysis and display, the resulting image strips for both the brightest and the weakest fluorophore and all of the others in between, will have a complete 12-bit dynamic range. In order to achieve this result with a non-MSIA scanner, the exposure of each of the fluorophores would have to be set perfectly and each fluorophore scanned separately. The exposure for the weakest fluorophore would have to be increased by a factor of approximately 16, normally by increasing the exposure time by a factor of 16 (decreasing the shutter speed by a factor of 16, which normally means the scan speed must be reduced), or by increasing the illumination intensity, or a combination of increased illumination intensity and decreased shutter speed, and the scan would be repeated for each fluorophore with new exposure settings for each scan.

If the range of brightness of the fluorophores being imaged is even greater than a factor of 16, the effective exposure time using MSIA can be increased even further by increasing the active area to increase the number of repeat patterns of the scan colour filter array, without changing the shutter speed of the camera, the illumination intensity, or the scan speed. Using the MSIA-based technique described herein, it is possible to image multiple fluorophores simultaneously, each with an effective exposure time that results in an image with a good range of brightness, and in a single scan. In addition, the fluorescence image strips are perfectly registered with each other because they were all acquired during the same scan.

In addition to using a scanning colour filter array, it is also possible to use a mosaic scan filter array in detector array 911. A "mosaic scan filter array" is generally defined as a mosaic filter array that is designed for high resolution imaging using MSIA scanning, typically where the resulting image has full colour information at each pixel position and typically without demosaicing or interpolation. In a mosaic scan filter array, each row of tiles is typically translated with respect to the next row of tiles in the same direction and perpendicular to the scan direction by one pixel position.

A schematic presentation of the center area of an example mosaic scan filter array for hyperspectral imaging is shown in FIG. 13. This example uses six different filters arranged in one-row by six-column tiles, however tiles can be arranged generally with any number of different filters positioned in a rectangular arrangement, where all tiles in an array are typically identical. For fluorescence imaging (multispectral imaging), the same design can be used where the filters C1 through C6 (which are fabricated for hyperspectral imaging) can be replaced by a series of fluorescence emission filters, F1 through F6 (when imaging six different fluorophores). In this example, the repeat pattern is 6 rows and is repeated across the active area of the detector array. In this example, each tile in the mosaic is a rectangle 1 pixel high by 6 pixels wide. If the position of colour filters in the tiles is rearranged to form tiles 2 pixels high by 3 pixels wide (a base pattern 2 pixels high), or 3 pixels high by 2 pixels wide (a base pattern 3 pixels high), the result after MSIA scanning is the same—all six colours have been acquired for every pixel position in the final image strip when the image of the specimen has moved a distance equal to the repeat pattern across the surface of the detector array.

Mosaic scan filter arrays can be designed to include any number of fluorophores, and can also include additional filters for R,G,B and W(clear) imaging in MSIA scans that are separate from the fluorescence scan.

"Hyperspectral imaging" generally refers to the method and technology for acquiring images in which each pixel is represented by a spectrum composed of narrow spectral bands over a continuous spectral range. "Imaging spectroscopy" generally refers to the acquisition and processing of hyperspectral images. Many technologies for hyperspectral imaging are based on the use of a diffractive element, like a prism or diffraction grating, to break up the light into its spectrum. Imaging is commonly performed on a point-by-point basis, or a line-by-line basis. One of many applications of hyperspectral imaging is the use of photoluminescence imaging to map the optical and electronic properties of semiconductors.

FIG. 11 shows a schematic view of a multiple-exposure hyperspectral MSIA scanner for spectral imaging according to a fourth embodiment. Light from light source 1115 is partially reflected by beamsplitter 1121 and is transmitted by microscope objective 115 to illuminate specimen 1100 from above (illumination of the specimen from above is called epi-illumination—several other arrangements to provide epi-illumination are possible). For this example, assume specimen 1100 is a photoluminescent specimen, like a compound semiconductor wafer. Beamsplitter 1121 is typically a dichroic beamsplitter chosen to reflect light from the light source and transmit light returning from the specimen. Specimen 1100 is mounted on specimen holder 101 on computer-controlled scanning stage 105. The motion of scanning stage 105 is controlled by computer 1101 through wired or wireless connection 107. Motion of the microscope stage is in a direction perpendicular to rows in the detector array {data is read out from adjacent rows in the detector array, where the rows are usually along the long dimension of the array, as shown in the example in FIG. 5}. Computer 1101 also controls the action of the shutter (usually an electronic shutter) in digital camera 1112. Photoluminescence from the specimen is collected by microscope objective 115 which is held at a focus position above the specimen by piezo positioner 120 (or other focusing mechanism), and this photoluminescence emission from the specimen is focused by tube lens 125 onto two-dimensional detector array 1111 inside digital camera 1112. Two-dimensional detector array 1111 includes a scanning colour filter array for hyperspectral imaging, one example of which is shown in FIG. 12.

A scanning colour filter array for photoluminescence imaging is typically made up of a repeat pattern of rows (that extend across substantially the width of the array) of different colour filters, where all of the filters in a row have the same colour, where each colour filter transmits a narrow spectral band, where the narrow spectral bands transmitted by the colour filters in the array together transmit an entire spectrum of light from the specimen. Scanning colour filter arrays have been designed for MSIA scanning such that when used in MSIA scanning, every pixel position in the final image contains full colour information (in this case a full spectrum), typically with no interpolation required.

FIG. 12 is a schematic view of the centre area of a scanning colour filter array with colour filters that transmit six adjacent narrow spectral bands that together make up a spectrum. In this example, each row of filters transmits a narrow spectral band that is adjacent in wavelength to those in adjacent rows, and the six rows form a repeat pattern that is typically repeated across the entire surface (or substantially the entire surface) of the sensor array (at least across the entire active area of the array). In this example the filter array transmits a spectrum containing six narrow spectral bands, however scanning colour filter arrays can be made with either fewer or more adjacent narrow spectral bands by decreasing or increasing the number of rows of filters in the repeat pattern. (Note that in some examples of scanning colour filter arrays, the same colour filters may appear in sets of two, three or more rows.) For the present example, assume that the repeat pattern is repeated 16 times inside the active area, so that the active area contains 96 rows, and that detector array 1111 is a 12-bit detector array. In this particular example, every object position is exposed 16 times for each of the six colours, and during each MSIA scan, DMIS 1102 stores six strip images, each of 16 bit dynamic range, one for each of the six colour filters. In this embodiment an image strip for each of the six colours in the spectrum has been acquired in a single scan. These six image strips are perfectly registered with each other because they were all acquired during the same scan, and can be assembled into a single six-colour image strip by DMIS 1102, and these image strips can be further combined into a single six-colour image of the entire specimen (or the area of interest in the specimen).

In order to estimate how valuable this technique is for hyperspectral imaging, assume that the illumination intensity, shutter speed and detector gain are set so that in the 16-bit image strip (or inside a specimen area of interest in this image strip) for the brightest pixel in the brightest narrow spectral band (which for this example we assume is C1), the maximum measured pixel intensity $P_{16}max$ is 60,000 (this is the brightest pixel in the 16-bit image strip for C1 in this particular specimen), and is the MSIA sum of 16 12-bit pixels that are nearly saturated. In the compressed 12-bit image strip for C1, that same pixel will have a value of (60,000/65,536)*4096=3750. However if that pixel is the brightest in the spectrum being measured, in order to achieve the best dynamic range for the entire spectrum when compressing the spectrum to 12 bits for viewing or further analysis, it would be best to compress the maximum 16-bit measured pixel value (in this example the maximum measured value was 60,000) to 4096, the largest value that can be viewed in a 12-bit image. This can be accomplished by multiplying all 16-bit pixel values, in all six MSIA image strips, by 4096/3750. Then all values in the 16-bit image strip for C1 (and for C2 to C6) can be compressed to 12 bits by multiplying the 16-bit pixel values $P_{16}$ resulting from MSIA addition of 12-bit values by $4096/P_{16}max$, where $P_{16}max$ is the largest 16-bit pixel value resulting from the MSIA calculation. Thus, $$P_{12}=P_{16}*(4096/P_{16}max),$$

where $P_{12}$ is the pixel value after compression to 12-bits, where that compression yields a full 12-bit dynamic range for the contracted spectrum, $P_{16}$ is the measured 16-bit value for that pixel after MSIA addition, and $P_{16}max$ is the maximum 16-bit pixel value measured after MSIA addition in any of the 16-bit image strips, for any of the narrow spectral bands.

In addition to using a scanning colour filter array, it is also possible to use a mosaic scan filter array in detector array 1111. A "mosaic scan filter array" is generally defined as a mosaic filter array that is designed for high resolution imaging using MSIA scanning, typically where the resulting image has full colour information at each pixel position and typically without demosaicing or interpolation. In a mosaic scan filter array, each row of tiles is typically translated with respect to the next row of tiles in the same direction and perpendicular to the scan direction by one pixel position. A schematic presentation of a mosaic scan filter array for hyperspectral imaging is shown in FIG. 13. In this example, the repeat pattern is 6 rows and is repeated across the active area of the detector array. In this example, each tile in the mosaic is a rectangle 1 pixel high by 6 pixels wide. If the position of colour filters in the tiles is rearranged to form tiles 2 pixels high by 3 pixels wide (a base pattern 2 pixels high), or 3 pixels high by 2 pixels wide (a base pattern 3 pixels high), the result after MSIA scanning is the same—all six colours have been acquired for every pixel position in the final image strip when the image of the specimen has moved a distance equal to the repeat pattern across the surface of the detector array. Mosaic scan filter arrays can be designed to include any number of filters that define narrow spectral bands, and can also include additional filters for R,G,B and W(clear) imaging in MSIA scans that are separate from the hyperspectral imaging scan.

When the number of rows in the active area of the detector is increased (either in hardware or using software to process only rows near the centre of the frame image, for both multispectral and hyperspectral imaging), the two optional steps described earlier become more important. When using an active area with 256 rows, for example, the effect of geometric distortion on the scanned image is increased, making it more important to correct each frame image (or at least the active area) for geometric distortion, and darkframe subtraction can also be used if required to further reduce noise in the image.

High Dynamic Range (HDR) and IDR Imaging

In digital photography, a scene often has a greater dynamic range than can be captured by the camera's sensor in a single exposure. One example is landscape photography at sunset or sunrise, where the sun is extremely bright, but where shadows can be very dark. Commonly, the photographer sets the exposure by adjusting the exposure time (shutter speed), lens aperture and detector gain to get the "best exposure" possible in the circumstances, but the setting sun is overexposed and shadow detail is lost in the dark areas of the picture. In order to capture a larger dynamic range, a technique known as HDR (High Dynamic Range) imaging has been developed to enable the capture of images with a dynamic range that is higher than that of the camera's sensor. This is accomplished by capturing a series of images of the same scene using different exposures and combining the series of images to produce a single image with a larger dynamic range, without moving the camera. Commonly, the different exposures are accomplished by changing the shutter speed from one exposure to the next, without moving the camera. Sometimes this is combined with changes in detector gain, but the lens aperture is kept constant to ensure that the depth of field is constant in the series of exposures.

Most commonly, a series of exposures are acquired in which the first image frame has the exposure that would be chosen by the photographer to best expose the image in a single frame (in the example above, most pixels in the image of the setting sun would be saturated, and shadows would be very dark with little detail). A second exposure is taken in which the shutter speed is half that used for the first exposure (half the exposure time), reducing the exposure by a factor of 2. In this second exposure, the sun and the area around it are not as bright as in the first exposure, and detail is increased in this part of the image. If the sun is still overexposed, a third exposure can be made using half the shutter speed of the second exposure, adding even more detail to the area of the image around the sun. In order to add detail to the shadow areas, a fourth exposure is made using a shutter speed that is twice that used in the first exposure (double the exposure time) which brightens the shadow areas in the image, adding detail to the shadows. If the shadows are still too dark, a fifth exposure can be made using an even longer shutter speed (twice the exposure time of the fourth exposure), brightening the shadows even more. This is equivalent to taking five exposures, where the first exposure is $E_0$, followed by $E_0-1$ EV, $E_0-2$ EV, $E_0+1$ EV and $E_0+2$ EV.

Many digital photography cameras have been programmed to automatically expose and store a series of images with changes in exposure like those above. In digital photography, the series of images is commonly centered on the "best exposure" image. In many cases, fewer images can be recorded with 2 EV steps between images, with good results when the images are combined to produce an HDR image. Software has been developed to combine a series of images with different exposure values to produce a single HDR image, to control how the tones are mapped to produce an image for viewing, and to compress the dynamic range in the image for storage and for viewing on an output device (i.e., a printer, computer screen, etc.) or for additional processing.

When using MSIA scanning, it has been discovered that it is also possible to generate (in some cases in a single scan) a series of strip images that have the same dynamic range, but with different effective exposures. Let's return for example to the multiple-exposure brightfield greyscale MSIA scanner shown in FIG. 6, and to the series of image strips shown in FIG. 7. In this example, the dynamic range of the detector array was 12 bits. In FIG. 7, strip 1 is a 12-bit image where the exposure was chosen to ensure that there are no saturated pixels (or at least no saturated pixels in the active area of interest in the specimen). Strip 2 is a 13-bit image where the exposure has been increased by 1 EV, and Strip 3 is a 14-bit image where the exposure has been increased by 2 EV (as compared to Strip 1).

One can now generate an HDR image using this image data, such as by using the HDR software that has been developed for photography. To do so, it is necessary in this example to change Strip 2 into a 12-bit image with +1 EV in exposure, and Strip 3 into a 12-bit image with +2 EV. In an image with a 12-bit dynamic range, the maximum value for a pixel is 4095. Strip 2 can be converted into a 12-bit image that has twice the effective exposure of Strip 1, and was generated by a detector array with a dynamic range of 12 bits, by replacing every pixel value in strip 2 that has a value larger than 4095 with the value 4095 (i.e., the value for a saturated pixel). In the same way, Strip 3 can be converted into a 12-bit image with four times the effective exposure of strip 1 by replacing every pixel value in strip 3 that is larger than 4095 with the value 4095.

Using this process, three strip images with three effective exposures have been generated that correspond to the images normally used for HDR imaging software that was developed for photographing stationary scenes. This type of software can therefore now be used to combine the three strip images and to tone map the final strip image for viewing (i.e., on a display screen). Notably, a larger number of effective exposures can be made when there is a large difference in brightness in the specimen data.

One interesting and major advantage of MSIA imaging in some cases (when performing HDR imaging) is that (in some exemplary embodiments) all of the images with different effective exposure values can be generated from a single scan.

MSIA HDR imaging techniques are very useful when capturing colour images, like those obtained when scanning tissue or other biological specimens that have been dyed. FIG. 14 shows a schematic view of a multiple exposure brightfield MSIA scanner for EDR or HDR imaging according to a fifth embodiment. Light from white light source 1410 illuminates a specimen 1402 from beneath, the specimen is mounted on specimen holder 101 on computer-controlled scanning stage 105. Biological specimens are normally covered by a thin transparent cover slip (not shown). The motion of scanning stage 105 is controlled by computer 1406 through wired or wireless connection 107. Motion of the scanning stage is in a direction perpendicular to rows in the detector array {data is read out from adjacent rows in the detector array, where the rows are usually along the long dimension of the array, as shown for example in FIG. 2}. Computer 1406 also controls motion of scanning stage 105 and the action of the shutter (usually an electronic shutter) in digital camera 1412. Light from the specimen is collected by microscope objective 115 which is held at a focus position above the specimen by piezo positioner 120 (or other focusing mechanism) and this light from the specimen is focused by tube lens 125 onto two-dimensional colour detector array 1411 inside digital camera 1412.

In this example, which is one of many possibilities, colour detector array 1411 includes an RGBW scan filter array, the centre of which is shown in FIG. 3 that has an active area of 64 rows that extends across the width of the array, and a 4 row repeat pattern. In this MSIA imaging example we will discard the data for the W pixels, and consider only the R, G and B pixel data. (The W pixels are commonly used in MSIA scanning as panchromatic elements, and can also be used with epi-illumination and separate emission filters for MSIA fluorescence scanning.) Pixel data from the active area of detector array 1411 (the image frame) inside digital camera 1412 is read out by frame grabber 150 and passed to computer 1406 during the scan. Computer 1406 passes the image frame data to Data Manipulation and Image Store 1407 after each frame has been collected.

In this example, the active area on the detector array is defined as 64 rows, so if an image frame is acquired every time the optical image of the specimen moves a distance equal to the distance between adjacent rows in the detector, every object pixel position is exposed 16 times for each of the four colours (R, G, B and W) as the scan proceeds. Exposure for each single image frame is set by adjusting the illumination intensity and shutter speed {where the shutter speed should be fast enough so the shutter is open for a time that is less than half the time it takes for the scanned image to move a distance equal to the distance between rows of pixels in the detector array (1/10 of the time is better)}.

The exposure should be adjusted so that no (or very few) pixels in the image frames containing information about the area of interest in the specimen are saturated. If we are using a camera 1412 with a dynamic range of 12-bits (in this example), after 16 exposures are added together in the MSIA scan, the largest possible value stored in the image strip store for any one colour is 4095*16=65,520. This is essentially a 16-bit image store for each colour, and the three colour image strips can be combined into an extended dynamic range (EDR) 48-bit RGB colour image strip. This extended dynamic range colour image strip can then be compressed in dynamic range and tone mapped to provide a final image strip for storage, viewing or further image processing.

On the other hand, the HDR methods that were developed for photography and discussed earlier can also be used in this situation. Since we are using a 12-bit camera, we can define a base exposure $E_0$ as the exposure of a 12-bit image, and as before, the base exposure should be set so there are no saturated pixels in the area of interest in the specimen.

An image with a dynamic range of 12 bits and effective exposure $E_0$ is generated by dividing all 16 bit pixel values for each colour in the 48-bit RGB colour image strip by 16.

An image strip with an effective exposure $E_0+1$ EV can be generated by dividing by 8, one with an effective exposure $E_0+2$ EV can be generating by dividing by 4, one with an effective exposure $E_0+3$ EV can be generated by dividing by 2, and the original 48-bit colour image strip has an actual exposure of $E_0+4$ EV.

In each of these five strip images, pixel values for each colour that are larger than 4095 are replaced by 4095, resulting in a series of five strip images that each have a dynamic range of 12 bits, but different effective exposures (which in this case differ by a factor of 2).

Note that in addition to being able to generate all of these strip images using a single scan, the strip images benefit from noise reduction because of MSIA averaging. These five strip images can be loaded into an HDR imaging program to generate an HDR image, which in turn can then be tone mapped and compressed in dynamic range for viewing, storing and further computation.

In some cases, in order to increase the number of levels stored while reducing the file size, HDR images may be saved in floating-point format. When compressing HDR images for viewing, local tone-mapping algorithms may be used to increase local contrast and detail in the LDR image (one area where this may be useful is in tissue imaging). In other applications, global tone-mapping algorithms may be used to compress the colours in the HDR image in a linear way.

Generally speaking, according to some of the teachings herein, two or more strip images can be generated using MSIA-processed image data (particularly image data taken from a single scan), with each strip image having a different effective exposure. In particular, the effective exposure of each of these strip images can be varied by dividing or multiplying the bit pixel values for each image by a particular amount, such as by a positive integer. For example, the 16 bit pixel values for a particular strip image can be divided by 16 to generate a first strip image having a first effective exposure, and can be divided by 8 to generate a second strip image having a second effective exposure.

A plurality of strip images with different effective exposures can then be combined (i.e., using HDR software or other comparable techniques) to generate an image with an increased dynamic range (an IDR image). In some cases, the combination can be done by adding a plurality of strip images together, by averaging a plurality of strip images together, or by a combination of adding and averaging a plurality of strip images together.

In some cases, n strip images with different effective exposures can be generated by dividing or multiplying the bit pixel values by n different integers, and then combined to generate an image of the specimen, such as an IDR image.

The number and effective exposures of the strip images can be selected in a manner that is generally more flexible than the exposure values typically associated with HDR imaging. In particular, in some cases the dynamic range of the IDR image can be extended beyond the dynamic range that might be available using HDR imaging. Such teachings could be used for brightness balancing, for example, or for other applications.

For example, one such application is automatic exposure adjustment. In particular, by adding, averaging, and/or otherwise combining strip images having different effective exposures, the teachings herein lend themselves to provide automatic exposure adjustment of a particular specimen (e.g., after the specimen has been scanned). In particular, image data of a specimen can be captured generally using a detector that may be set to a certain exposure setting (i.e., a normal exposure setting for brightfield imaging, or for fluorescence imaging), and generally without the need to tinker or adjust the detector settings to accommodate very bright or very dim specimens (in some cases similar adjustments need not be made to shutter speed, etc.) By using this image data to generate multiple strip images with different effective exposures, the resulting image of the specimen (i.e., the IDR image) that is generated can be "calibrated" or "tuned" to desired particular exposure levels. This can allow, for example, one image of a specimen to provide high levels of detail of very dim fluorescent artifacts. Moreover, in some cases a different image of the specimen can be generated using the same image data that shows artifacts at a different level of brightness. This flexibility can eliminate or at least reduce the need to change the exposure of the detector in order to detect artifacts of different brightness within a particular specimen, and in effect allows for automatically adjusting the exposure of the detector after the specimen has been scanned.

The invention claimed is:
1. An instrument for scanning a specimen on a specimen holder, comprising:
   a. a scanning stage for supporting the specimen;
   b. a detector having a plurality of pixels, the scanning stage and the detector movable relative to each other to move the specimen in a scan direction during a scan, wherein at least some of the pixels of the detector are operable to collect light inside the specimen during the scan and generate corresponding image data; and c. a processor operable to:
  i. perform moving specimen image averaging (MSIA) on the image data and to generate two or more strip images, each strip image having a different effective exposure, each effective exposure of each strip image being varied by dividing or multiplying each bit pixel value for that strip image by a particular amount, and
  ii. combine the two or more strip images to generate an image of the specimen.

2. The instrument of claim 1, wherein the image of the specimen is an increased dynamic range (IDR) image.

3. The instrument of claim 1, wherein the particular amount is a positive integer.

4. The instrument of claim 1, wherein the two or more strip images are added together to generate the image of the specimen.

5. The instrument of claim 1, wherein the two or more strip images are averaged to generate the image of the specimen.

6. The instrument of claim 1, wherein the two or more strip images are averaged and added together to generate the image of the specimen.

7. The instrument of claim 1, wherein the two or more strip images are combined using HDR.

8. The instrument of claim 1, wherein the image of the specimen has a dynamic range higher than a dynamic range of the detector.

9. The instrument of claim 1, wherein the image of the specimen is generated using a first strip image having a first effective exposure and a second strip image having a second effective exposure.

10. The instrument of claim 9 wherein the second effective exposure is greater than the first effective exposure.

11. The instrument of claim 1, wherein the image of the specimen is generated using a third strip image having a third effective exposure.

12. The instrument of claim 11 wherein the third effective exposure is greater than the second effective exposure.

13. The instrument of claim 1 further comprising at least one filter, and wherein the image data includes at least one filtered image.

14. The instrument of claim 13, wherein the filter includes a color filter, and the filtered image includes at least two differently colored images.

15. The instrument of claim 1, further comprising generating a plurality of images of the specimen from the image data.

16. The instrument of claim 15, wherein the plurality of images of the specimen includes a first specimen image having a first dynamic range and a second specimen image having a second dynamic range.

17. The instrument of claim 16, wherein the first specimen image has a dynamic range selected to show artifacts in the specimen at a first brightness.

18. The instrument of claim 17, wherein the second specimen image has a dynamic range selected to show artifacts in the specimen at a second brightness.

19. The instrument of claim 1, wherein the instrument scans the specimen in one of brightfield and fluorescence.

* * * * *